(12) United States Patent
Okada (10) Patent No.: US 9,064,203 B2
(45) Date of Patent: Jun. 23, 2015

(54) PRINTING CONTROLLER FOR ENABLING PRINTER TO PERFORM PRINTING PROCESSING, HAS REGION SPECIFYING UNIT TO SPECIFY REGION HAVING SPECIFIC IMAGE DATA, COLOR DETERMINER, AND PREDETERMINED PROCESSOR TO APPLY DENSITY REDUCTION OF PIXEL

(71) Applicant: RISO KAGAKU CORPORATION, Tokyo (JP)

(72) Inventor: Yoshiyuki Okada, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/136,319

(22) Filed: Dec. 20, 2013

(65) Prior Publication Data

US 2014/0185100 A1 Jul. 3, 2014

(30) Foreign Application Priority Data

Dec. 27, 2012 (JP) ................................. 2012-283980

(51) Int. Cl.
G06K 15/02 (2006.01)
(52) U.S. Cl.
CPC .................. G06K 15/1868 (2013.01)

(58) Field of Classification Search
None
See application file for complete search history.

(56) References Cited

U.S. PATENT DOCUMENTS 8,500,023 B2 * 8/2013 Zolotov ................... 235/462.04
2012/0314260 A1 * 12/2012 Hakamada et al. ............ 358/2.1
2013/0050715 A1 * 2/2013 Yamatani ........................ 358/1.2

FOREIGN PATENT DOCUMENTS

JP H11289464 A 10/1999

* cited by examiner

*Primary Examiner* — Steven Kau
(74) *Attorney, Agent, or Firm* — Greenblum & Bernstein, P.L.C.

(57) ABSTRACT

There are provided a region specifying unit configured to specify a region containing a barcode which is a target to be subjected to density reduction processing and is constituted by black and image data other than the barcode constituted by a color different from black in original data; a color determiner configured to determine whether or not each pixel is black in the region specified by the region specifying unit; a density reduction processor configured to apply density reduction processing to the pixel determined by the color determiner to be black; and a print data creating unit configured to create the print data on the basis of the original data subjected to the density reduction processing.

1 Claim, 7 Drawing Sheets

PRINTING CONTROLLER FOR ENABLING PRINTER TO PERFORM PRINTING PROCESSING, HAS REGION SPECIFYING UNIT TO SPECIFY REGION HAVING SPECIFIC IMAGE DATA, COLOR DETERMINER, AND PREDETERMINED PROCESSOR TO APPLY DENSITY REDUCTION OF PIXEL

BACKGROUND OF THE INVENTION

1. Field of the Invention

The present invention relates to a printing controller which allows non-specific image data to be clearly printed while preventing blurring of specific image data and to a printing control method.

2. Related Background of the Invention

Barcodes are, as well known in general, a type of specific image data indicating identification codes such as numerical values and characters by stripe patterns made of a combination of black and white lines.

Patent Literature 1 proposes a technology relating to an image forming device which recognizes a barcode region from image information of an original read by a scanner and notifies an image forming unit of the recognized barcode region, the image forming unit executing monochrome printing for the barcode region on the basis of the notified barcode region information.

PRIOR ART DOCUMENT

Patent Literature

Patent Literature 1: Japanese Patent Application Laid-Open Publication No. Hei 11-289464

SUMMARY OF THE INVENTION

In this barcode, line widths of the black line and the white line are strictly specified and thus, if "bleeding" of ink occurs in the printed barcode, information cannot be expressed accurately.

In the image forming device described in Patent Literature 1, monochrome printing is executed on the barcode region, and it has been difficult to prevent occurrence of "bleeding" of black ink in the printed barcode.

Thus, when a barcode is to be printed by an inkjet printer widely used in recent years, in order that reading accuracy of the barcode is not deteriorated by bleeding of a dot gain, it can be considered to apply predetermined processing treatment to original images, such as performing printing by specifying a region in which a barcode is to be printed in each page and by setting ink density in this specified print region lower than that in a non-specified region.

However, the specified region might contain, for example, red image not read by a barcode reader (non-specific image data) such as characters overlapped with or close to a barcode and other than the barcode (those indicating information relating to the barcode and drawing an attention by being read by people). Thus, if printing is applied to the entire specified region including the barcode by setting the ink density lower than that in the non-specified region, the non-specific image data is also printed with lowered density, and an image becomes unclear and hard to be read in some cases.

The present invention was made in view of the above described problems and has an object to provide a printing controller which prints specific image data so as to be easily readable and also clearly prints non-specific image data even if the specific image data is overlapped with the non-specific image data, and a printing control method.

In order to achieve the above described object, a first feature of a printing controller according to the present invention is a printing controller for making a printer perform printing processing by sending print data, including: a region specifying unit configured to specify a region containing specific image data which is a target to be subjected to predetermined processing and is constituted by a same color and non-specific image data constituted by a color different from the same color in original data; a color determiner configured to determine whether or not each pixel has the same color in the region specified by the region specifying unit; a predetermined processor configured to apply the predetermined processing to the pixel determined by the color determiner to have the same color; and a print data creating unit configured to create the print data on the basis of the original data subjected to the predetermined processing.

A second feature of the printing controller according to the present invention is that further included is a color condition information storage unit configured to store a determination condition for each ink color for determining to have the same color of the specific image data, and the color determiner determines that each pixel in the region specified by the region specifying unit has the same color if all the determination conditions for each ink color are satisfied.

A third feature of the printing controller according to the present invention is that the specific image data is a barcode image and the predetermined processing is processing for reducing print density of the barcode image.

DESCRIPTION OF THE PREFERRED EMBODIMENTS

An embodiment of the present invention will be described below by referring to the attached drawings.

Figure 1:
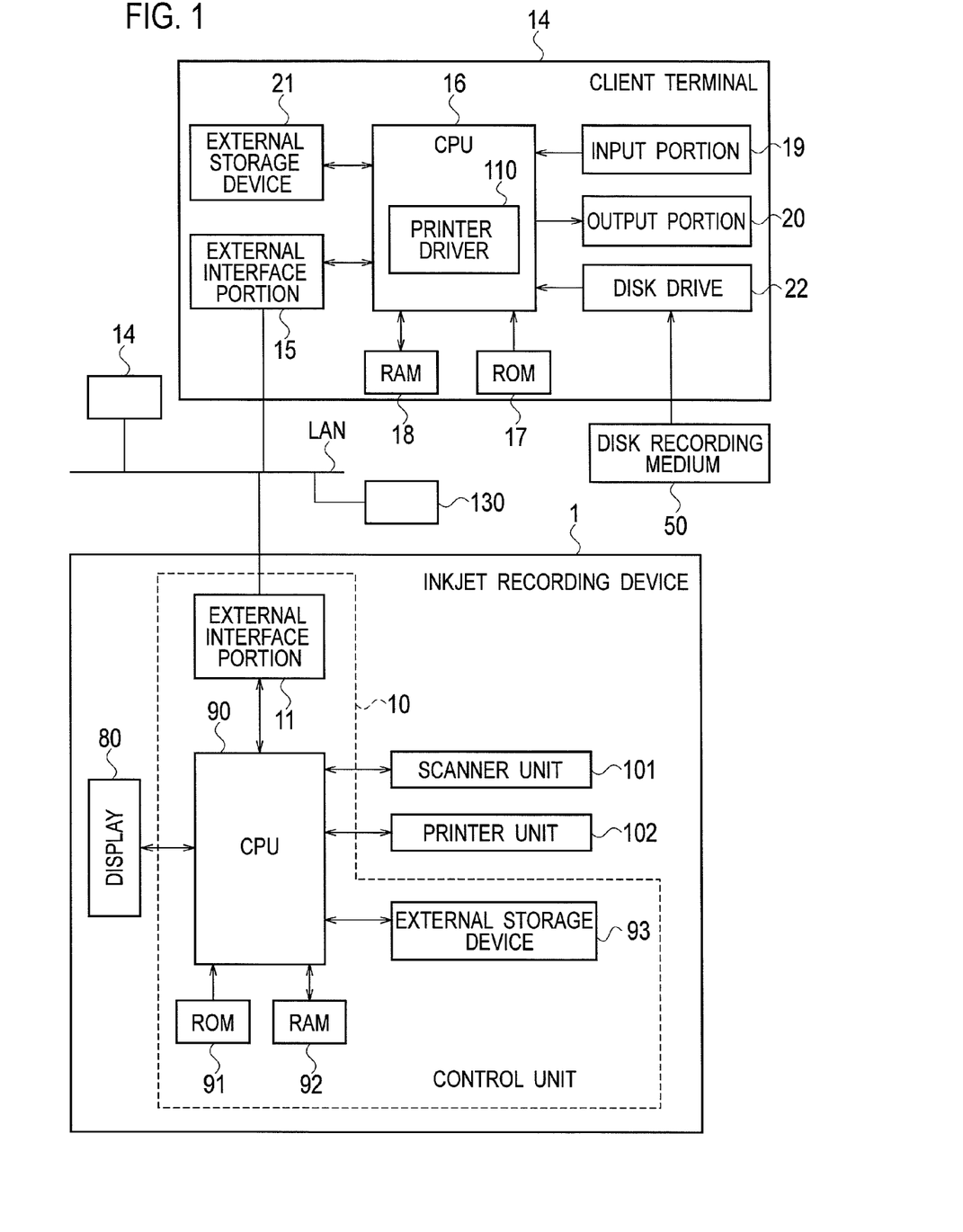
FIG. 1 is an explanatory diagram illustrating an outline configuration of a printer network system according to an embodiment of the present invention.

FIG. 1 is an explanatory diagram illustrating an outline configuration of a printer network system according to an embodiment of the present invention.

(Entire Configuration of Printer Network System)

As illustrated in FIG. 1, the printer network system of the present embodiment has an inkjet recording device functioning as a printer and a client terminal 14 functioning as a printing controller.

The inkjet recording device 1 is an inkjet-type line color printer, provided with a plurality of ink heads having a large number of nozzles formed therein, and each ink head discharges black or color ink so as to apply printing by the unit of line and forms a plurality of images in an overlapped manner on a print sheet on a transfer belt.

Specifically, as illustrated in FIG. 1, the inkjet recording device 1 includes a scanner unit 101 which reads out image information on an original as a print image (original image) and outputs an image signal, a printer unit 102 which prints (records) the print image on a recording sheet (one-sided or double-sided) on the basis of the image signal output from the scanner unit 101, and a control unit for entire control. The recording sheet used for printing of the print image in the printer unit 102 is conveyed to a paper discharge unit, not shown, through the printer unit 102 from a paper supplying unit, not shown.

Moreover, to an external interface portion 11 of the control unit 10, an external interface portion 15 of each of the plurality of client terminals 14 (only one client terminal 14 is illustrated in FIG. 1 as a typical example) is connected through a local area network LAN, respectively. The control unit 10 receives a print job from each of the client terminals 14. The inkjet recording device 1 executes printing processing in the printer unit 102 under a condition specified in the print job.

Moreover, a display 80 is connected to the control unit 10. This display 80 is arranged on an upper part of the inkjet recording device 1. This display 80 can be used as an input operation unit or the like into which a user inputs a copying condition such as the number of sheets to be copied and a copying magnification when the print image set in the scanner unit 101 is copied and printed.

The control unit 10 of the inkjet recording device 1 for allowing the above described printer unit 102 to perform a printing operation includes a CPU 90 as illustrated in FIG. 1. This CPU 90 controls operations of the scanner unit 101 and the printer unit 102 in accordance with contents input and set from the display 80 on the basis of a program and setting information stored in a ROM 91.

In the control unit 10, a RAM 92 is provided, and a print job input into the control unit 10 from the client terminal 14, the number of sheets to be printed for copying, various setting contents and the like input from the display 80 are stored in the RAM 92 at any time.

Moreover, in the control unit 10, an external storage device 93 is provided, and this external storage device 93 is connected to the CPU 90. In the external storage device 93, a plurality of regions for storing print jobs transferred from the above described RAM 92 is provided.

On the other hand, each of the client terminals 14 is constituted by a PC (personal computer) and the like. This client terminal 14 has a CPU 16 for executing various types of processing on the basis of a control program stored in a ROM 17. Moreover, to the CPU 16, a RAM 18 functioning as a working area, an input portion 19 constituted by a keyboard, a mouse and the like, an output portion 20 constituted by a liquid crystal display and the like, an external storage device 21, and a disk drive 22 are connected.

In the external storage device 21, a storage region for an application program for creating original data including print images such as documents and images, a storage region for a printer driver program of the inkjet recording device 1, and a storage region for other various application programs are ensured. Moreover, in the external storage device 21, color condition information associating a determination condition for determining whether a pixel of the original data is a black pixel or not with each ink color discharged from the ink head provided in the inkjet recording device 1 is stored. That is, the external storage device 21 functions as a color condition information storage unit. Furthermore, in the external storage device 21, database regions for storing the original data created by using the application program, the print data subjected to image conversion processing so that a barcode region is printed so as to be easily readable and a non-barcode region is clearly printed in the original data in accordance with predetermined print setting information or color condition information (PRN data, for example) are also ensured. Here, the print setting information is information required for ordinary printing such as a print mode, a size of the original data, resolution, and a size and a printing direction of a print sheet.

Moreover, in the present embodiment, this external storage device 21 stores an application program for creating forms. When this application program is read out and executed by the CPU 16, a form can be created. Forms to be created are, for example, a bill to be issued and delivered to each destination, a delivery slip issued when a product is delivered, and each of images thereof contains a barcode.

The CPU 16 is an arithmetic unit constituted by a processor, a memory and other peripheral devices and starts the application program of the external storage device 21 in accordance with a start request input from the input portion 19. Moreover, the CPU 16 creates original data indicating an image instructed by a parameter input or the like from the input portion 19 on the started application program. The created original data is displayed and output in the output portion 20, and if a storage request is input from the input portion 19, it is stored in a database region in the external storage device 21.

The original data stored in the database region of the external storage device 21 is read out from the external storage device 21 if a read-out request from the input portion 19 is input during start of the application program. A print image of the read-out original data can be displayed and output to the output portion 20 or can be processed and re-created into new original data on the application program.

Further, if a print request of the original data created by an original application program, an application program for creating a form or the like is input, the CPU 16 virtually constructs a printer driver 110 on the CPU 16 by causing the printer driver program to run on the CPU 16. Then, the printer driver 110 causes the inkjet recording device 1 to output a print job.

The printer driver 110 is a data conversion program executed on the client terminal 14 in order to control the inkjet recording device 1 connected to the client terminal 14. This printer driver 110 includes a printing control program and obtains the original data having a print image created by the original application or the like and creates print data (PRN data) in accordance with predetermined print setting information or color condition information. Then, the printer driver 110 outputs the print job including the created print data to the external interface portion 11 of the control unit 10 from the external interface portion 15.

Here, a case in which the original data containing a barcode in the print image is created by the application program for creating a form will be described. If the original data containing the barcode in the print image is to be printed by the inkjet recording device 1, it is important to avoid deterioration of reading accuracy of the barcode caused by a change in a width of a space bar (white portion) due to bleeding of ink of a colored bar (solid black portion) of the barcode. For that purpose, it is effective to print the colored bar portion with density lower than that for the portions other than the barcode and to realize high reading accuracy by suppressing bleeding of the ink. However, it is premised that printing is made with minimum density or more with which the barcode can be read out. On the other hand, the image other than the barcode needs to be printed clearly without reducing the density.

Figure 2:
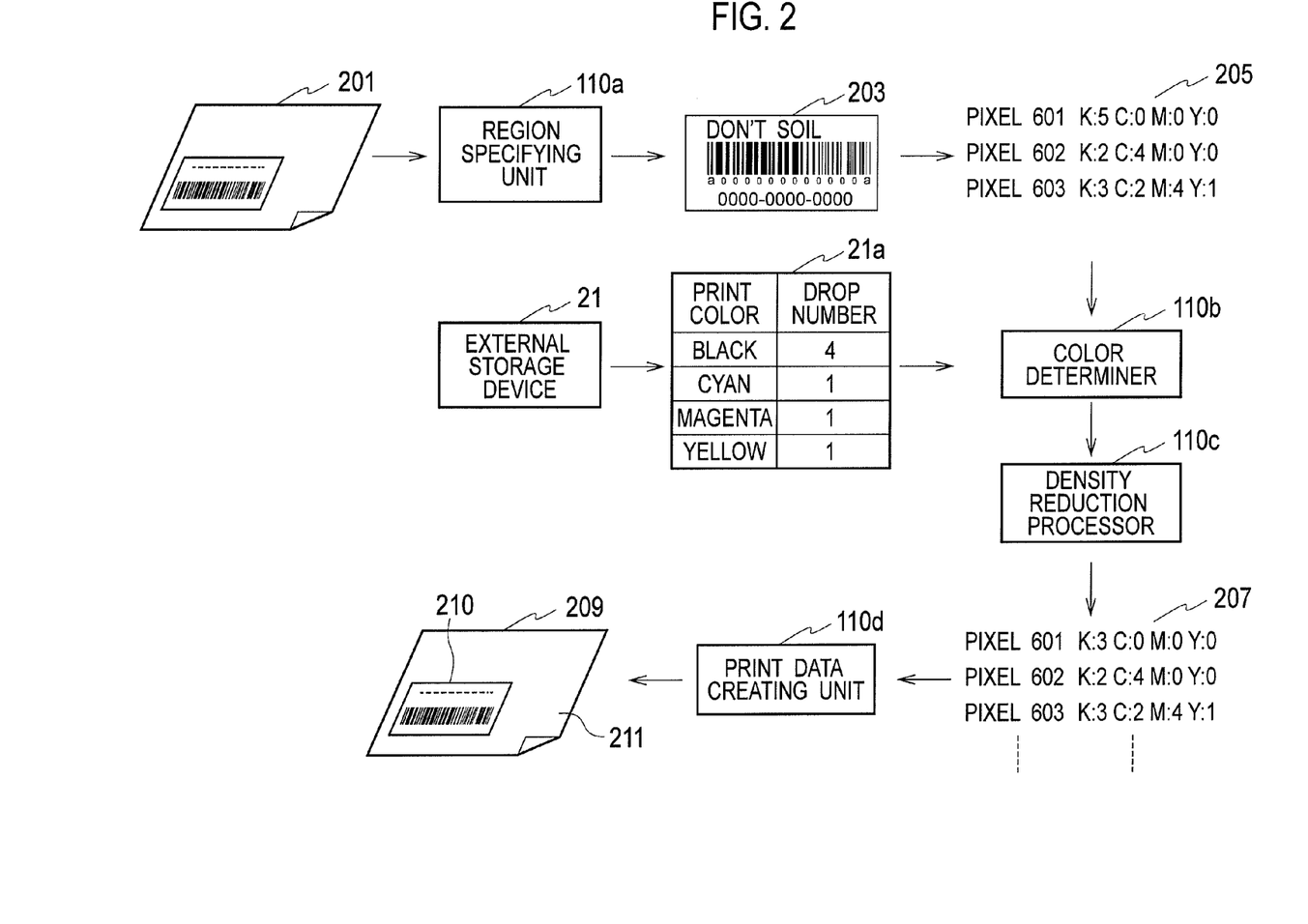
FIG. 2 is a diagram schematically explaining processing by a CPU of a client terminal in the present embodiment.

FIG. 2 is a diagram schematically explaining processing by the CPU 16 of the client terminal 14 in the present embodiment.

In the CPU 16, a region specifying unit 110a illustrated in FIG. 2, a color determiner 110b, a density reduction processor 110c, and a print data creating unit 110d are implemented by executing the printer driver including the printing control program.

By means of execution of the application program for creating a form by the CPU 16, original data 201 which is form data containing a barcode is created.

Figure 3:
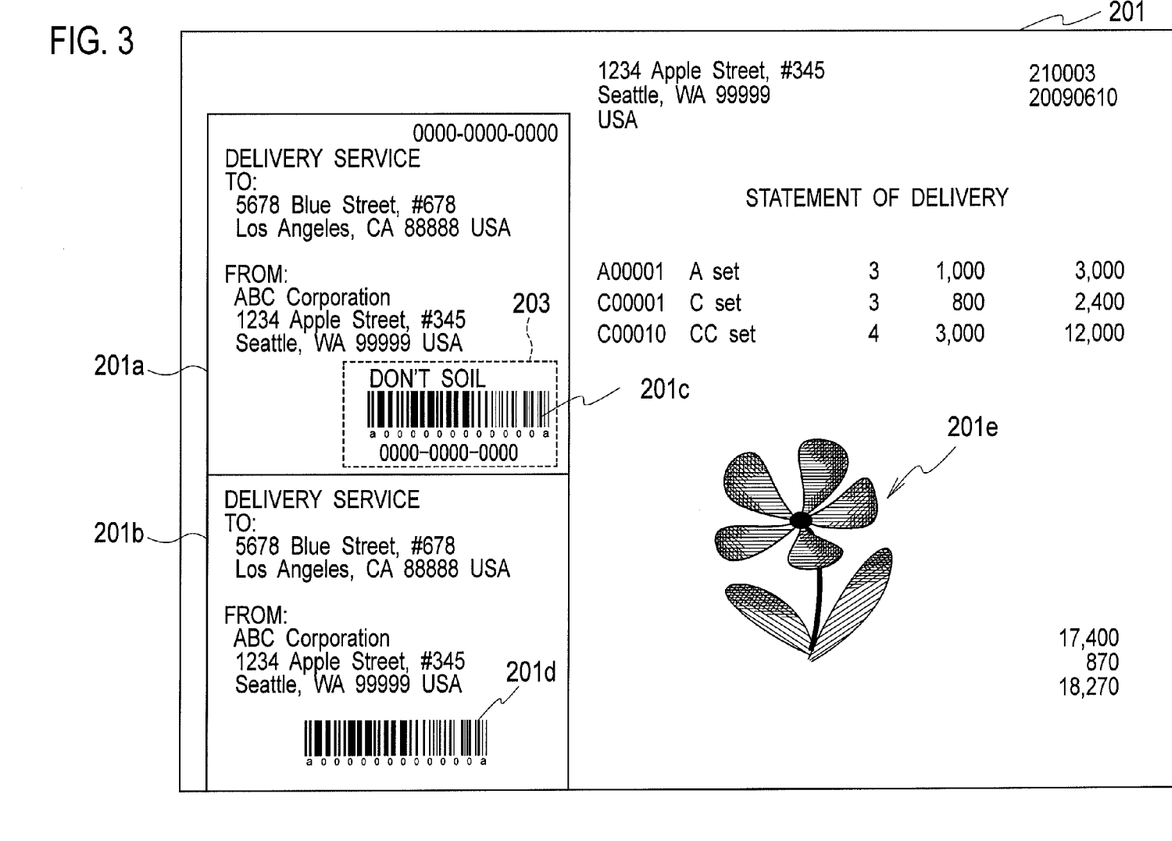
FIG. 3 is a diagram illustrating an example of original data which is form data created in the client terminal in the present embodiment.

FIG. 3 is a diagram illustrating an example of the original data 201 which is the form data created in the client terminal 14 in the present embodiment. Here, the original data 201 is converted from an RGB value (Red, Green, and Blue) to a CMYK value (Cyan, Magenta, Yellow, and Key Plate i.e. Black), and moreover, it is converted to drop data which is gradation data indicating the number of drops (discharge number) of ink discharged from an ink head, that is, data taking gradation from 0 to 5 for each CMYK in correspondence with each density of CMYK.

As illustrated in FIG. 3, the original data 201 includes print images 201a and 201b created in color, and the print images 201a and 201b include barcodes 201c and 201d, respectively. Moreover, the original data 201 includes a print image 201e which is a color photo image.

Further, the region specifying unit 110a specifies a region containing the barcodes 201c and 201d which are targets to be subjected to density reduction processing (predetermined processing) and constituted by black and non-specific image data other than the barcodes 201c and 201d in the original data 201 on the basis of a user's operation input from the input portion 19.

In the original data 201 illustrated in FIG. 3, when a user performs an operation of surrounding the barcodes 201c and 201d by using a mouse or the like, the region specifying unit 110a can specify a specified region 203 as a region containing the barcode 201c, for example.

Here, the drop data 205 of the specified region 203 expresses a pixel 601 as "black (K): 5 drops, cyan (C): 0 drops, magenta (M): 0 drops, yellow (Y): 0 drops", expresses a pixel 602 as "black (K): 2 drops, cyan (C): 4 drops, magenta (M): 0 drops, yellow (Y): 0 drops", and expresses a pixel 603 as "black (K): 3 drops, cyan (C): 2 drops, magenta (M): 4 drops, yellow (Y): 1 drop", for example, as illustrated in FIG. 2.

If a region is specified by the region specifying unit 110a, the color determiner 110b determines whether or not each pixel in the region specified by the region specifying unit 110a satisfies all the determination conditions of each of ink colors of color condition information 21a stored in the external storage device 21. Here, the color condition information 21a is stored in the external storage device 21 in advance as "black (K): 4 drops, cyan (C): 1 drop, magenta (M): 1 drop, yellow (Y): 1 drop" as illustrated in FIG. 2.

The color information of the color determiner is set so that a barcode is printed with high density so that possibility of defective reading becomes high when the barcode is read by a barcode reader. In acquiring setting of them, a sheet used for the printing device, ink used for the printing device, reading accuracy of the barcode reader and the like may be considered. A reduction amount which will be described later may be also acquired by considering these matters.

Therefore, if black (K) exceeds 4 drops and cyan (C), magenta (M), and yellow (Y) are less than 1 drop, respectively, for each pixel, all the determination conditions of each ink color of the color condition information 21a are satisfied, and thus the color determiner 110b determines that the target pixel is a black pixel which is a print color of the barcode.

Since black (K) has 5 drops in the pixel 601, for example, it exceeds 4 drops and since cyan (C), magenta (M), and yellow (Y) have 0 drops, respectively, all of them have less than 1 drop. Thus, since all the determination conditions for each ink color of the color condition information 21a are satisfied, the color determiner 110b determines that the target pixel is a black pixel for the pixel 601.

Moreover, for the pixel 602, since black (K) has 2 drops, it is 4 drops or less, and since cyan (C) has 4 drops it is not less than 1 drop. Thus, since all the determination conditions for each ink color of the color condition information 21a are not satisfied for the pixel 602, the color determiner 110b determines that the target pixel is not a black pixel.

Furthermore, similarly for the pixel 603, since black (K) has 3 drops, it is not more than 4 drops and since cyan (C), magenta (M), and yellow (Y) have 2 drops, 4 drops, and 1 drop, respectively, all of them have 1 drop or more. Thus, since all the determination conditions for each ink color of the color condition information 21a are not satisfied, the color determiner 110b determines that the target pixel is not a black pixel for the pixel 603, either.

Subsequently, the density reduction processor 110c executes density reduction processing for reducing density for the pixel from which black is detected by the color determiner 110b. In the example in FIG. 2, the density reduction processor 110c reduces the drop number of black (K) by 2 drops from 5 drops to 3 drops for the pixel 601 determined to be a black pixel.

On the other hand, the density reduction processor 110c does not execute the density reduction processing for the pixels 602 and 603 determined not to be black pixels but lets them keep the original drop numbers.

That is, the density reduction processor 110c executes processing (density reduction processing) for reducing the print density of a barcode image which is specific image data as the predetermined processing. Since the predetermined processing is processing for reducing the print density of the barcode image, the density of the barcode image can be reliably reduced.

Then, the print data creating unit 110d creates print data 209 by combining image data 210 of the specified region for which the density reduction image processing is executed by the density reduction processor 110c and image data 211 of regions other than the specified region.

Consequently, the CPU 16 provided in the client terminal 14 in the present embodiment prints the barcode (specific image data) so as to be easily readable and also prints an image other than the barcode (non-specific image) clearly even if the barcode (specific data) and the image other than the barcode (non-specific image) are overlapped.

Figure 4:
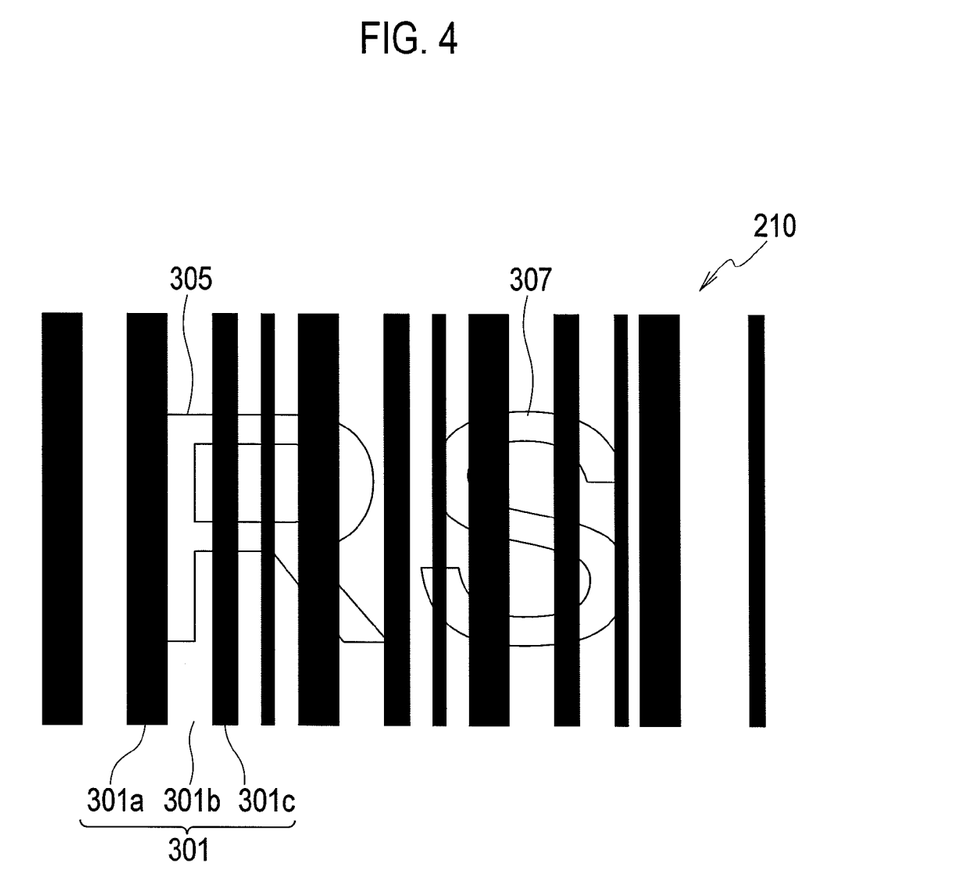
FIG. 4 is a diagram obtained by enlarging an example of image data of a specified region in print data created by the client terminal in the present embodiment.

FIG. 4 is a diagram obtained by enlarging an example of the image data 210 of the specified region in the print data 209 created by the client terminal 14 in the present embodiment. This case is an example in which the barcode and characters are overlapped.

As illustrated in FIG. 4, the image data 210 of the specified region contains a barcode 301, and character data 305 of a red character "R" and character data 307 of "S" are overlapped with the barcode 301. The original data is gradation data indicating the drop number (discharge number) of ink after being overlapped.

In the case of such image data 210, colored bars (solid black portions) 301a and 301c of the barcode 301 contained in the image data 210 of the specified region are determined to be black pixels, and the density reduction processing of subtracting the drop number of black (K) by 2 drops is executed.

On the other hand, a space bar (white portion) 301b of the barcode 301 contained in the image data 210 of the specified region is determined not to be a black pixel, and the original drop number is maintained without execution of the density reduction processing. Here, since the space bar 301b is overlapped with the character data 305 of the red character "R", regarding the space bar 301b, the character data 305 is clearly printed in red character with the original drop number without execution of the density reduction processing.

Even if red becomes clear, since the barcode reader does not read red, a reading quality of the barcode is not lowered. On the other hand, if red is not clear, a person who sees the printed matter cannot read out "RS" illustrated in FIG. 4. That is why the above described processing is performed.

Subsequently, a processing procedure by the CPU 16 of the client terminal 14 in the present embodiment will be described in detail.

Figure 5:
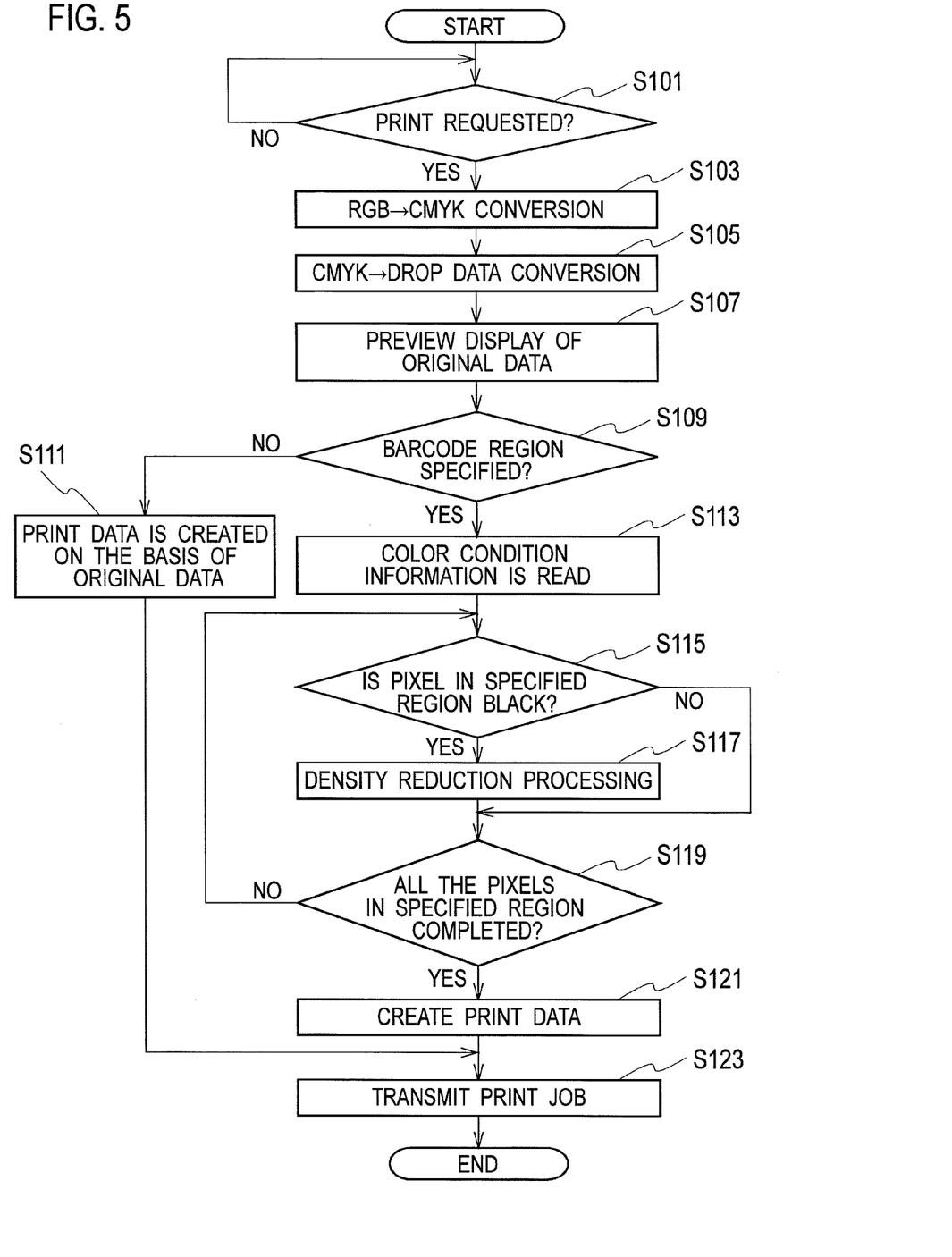
FIG. 5 is a flowchart for explaining a processing procedure by the CPU of the client terminal in the present embodiment.

FIG. 5 is a flowchart for explaining the processing procedure by the CPU 16 of the client terminal 14 in the present embodiment.

As illustrated in FIG. 5, if a print request of the original data created by the original application program, the application program for creating a form or the like is input (Step 101; YES), the CPU 16 converts the original data from the RGB value to the CMYK value (Step S103) and moreover, converts the CMYK value to the drop data which is gradation data indicating the drop number (discharge number) of ink discharged from the ink head (Step S105).

Subsequently, the CPU 16 makes the output portion 20 display and output a preview image of the original data having been converted to the drop data (Step S107).

Then, on the basis of a user's operation input from the input portion 19, it is determined whether or not a region within the original data 201 and containing a barcode is specified (Step S109).

At Step S109, if a region containing a barcode is not specified (in the case of NO), the print data creating unit 110d creates print data on the basis of the original data without executing the density reduction processing (Step S111).

On the other hand, at Step S109, if a region containing a barcode is specified (in the case of YES), the color determiner 110b reads out color condition information stored in the external storage device 21 (Step S113).

Subsequently, the color determiner 110b determines whether or not the pixel in the region specified by the region specifying unit 110a is a black pixel (Step S115). Specifically, regarding the pixels in the region specified by the region specifying unit 110a, if all the determination conditions for each ink color of the color condition information are satisfied, the color determiner 110b determines that the target pixel is a black pixel on the basis of the color condition information read out at Step S113.

At Step S115, if the target pixel is determined to be a black pixel (in the case of YES), density reduction processing is executed for the target pixel (Step S117).

Subsequently, if the color determiner 110b has made determination on whether or not the target pixel is a black pixel for all the pixels in the specified region (Step S119; YES), the print data creating unit 110d creates print data by combining image data of the specified region for which the density reduction processing is executed and image data of the regions other than the specified region (Step S121).

Then, the CPU 16 adds a header such as an address and the like to the created print data and transmits the result to the inkjet recording device 1 as a print job (Step S123).

The printer driver program including the printing control program for causing the CPU 16 to execute the above described processing and various application programs can be read out from a disk-shaped recording medium 50 such as an optical disk by a disk drive 22 of the client terminal 14 and installed (stored) in the external storage device 21.

As described above, according to the client terminal 14 (printing controller) in the present embodiment, in the original data, since the region specifying unit 110a for specifying a region containing a barcode (specific image data) which is a target to be subjected to the density reduction processing (predetermined processing) and constituted by the same color (black) and image data (non-specific image data) other than the barcode, constituted by a color different from the same color (black), the color determiner 110b for determining whether or not each pixel has the same color (black) in the region specified by the region specifying unit 110a, a density reduction processor 110c (predetermined processor) for applying density reduction processing to the pixel determined by the color determiner 110b to have the same color (black), and the print data creating unit 110d for creating print data on the basis of the original data subjected to the density reduction processing are provided, when print processing is to be performed by the inkjet recording device 1 (printer), even if the barcode and an image other than the barcode (non-specific image) are overlapped, the barcode can be printed so as to be easily readable, and the image other than the barcode (non-specific image) can be printed clearly.

In the present embodiment, the client terminal 14 detecting black as the same color as that of the barcode for each pixel in the region specified by the region specifying unit 110a was explained as an example, but the color is not limited to black, and any color such as blue or green, for example, may be used as long as it can be read by a barcode reader set in advance. Moreover, in the case of black, not only black printed by using only black (K) ink but the black may contain so-called composite black in which black (K), cyan (C), magenta (M), and yellow (Y) are combined.

Specifically, color condition information 21a is stored in the external storage device 21 as "black (K): 4 drops, cyan (C): 2 drops, magenta (M): 2 drops, and yellow (Y): 2 drops" in advance, the color determiner 110b determines that the determination condition of each ink color of the color condition information 21a is satisfied and the target pixel is a black pixel if black (K) exceeds 4 drops and also, cyan (C), magenta (M), and yellow (Y) have less than 2 drops, respectively, for each pixel in the specified region. As a result, the pixel which is composite black of "black (K): 5 drops, cyan (C): 1 drop, magenta (M): 1 drop, and yellow (Y): 1 drop", for example, is determined to be black.

Moreover, in the present embodiment, the case in which the original data 201 is converted from an RGB value to a CMYK value and moreover, is drop data which is gradation data indicating the drop number (discharge number) of ink discharged from the ink head was described as an example, but this is not limiting, and the original data 201 may be a CMYK value converted from an RGB value.

Regarding the CMYK value, when it is expressed as a component value of 0 to 100(%), for example, the color condition information 21a is stored in the external storage device 21 in advance as "black (K): 80(%), cyan (C): 20(%), magenta (M): 20(%), and yellow (Y): 20(%)", for example, and it may be so configured that, if black (K) exceeds 80(%) and also, cyan (C), magenta (M), and yellow (Y) have less than 20(%), respectively, all the determination conditions for each ink color of the color condition information 21a are satisfied, and thus, the color determiner 110b determines that the target pixel is a black pixel for each pixel in the specified region. In this case, the color black according to ink characteristics or a printer model can be set in more detail.

That is, if all the determination conditions for each ink color stored in the external storage device 21 (color condition information storage unit) are satisfied, the color determiner 110b determines the color to be the same color constituting the barcode (specific image data) for each pixel in the region specified by the region specifying unit 110a, and thus, by setting the color condition information in advance, various colors can be set as a print color. If black is expressed by composite black of CMYK, for example, by changing a ratio of CMYK of the determination condition for each ink color stored in the external storage device 21 (color condition information storage unit), various colors can be set as a print color of the barcode.

Moreover, in the present embodiment, the processing in which the region is specified by using an RGB value and the RGB value is converted to a CMYK value may be performed by the inkjet recording device 1. Or the color determiner 110b and the print data creating unit 110d may be provided in the inkjet recording device 1.

<Variation 1>

Moreover, in the present embodiment, the client terminal 14 in which, by means of an operation by a user of surrounding a barcode using a mouse which is the input portion 19, the region specifying unit 110a specifies a region containing the surrounded barcode as a region was explained as an example, but this is not limiting, and the region specifying unit 110a may specify a region other than the surrounded image as a region containing a barcode by means of an operation of surrounding an image other than the barcode.

Figure 6A:
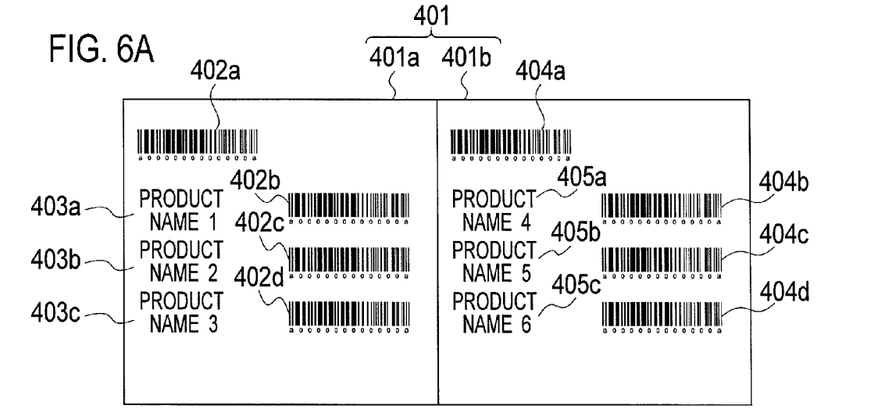
FIG. 6A is a diagram illustrating an example of the original data which is the form data created in the client terminal in a variation 1 of the present embodiment.
Figure 6B:
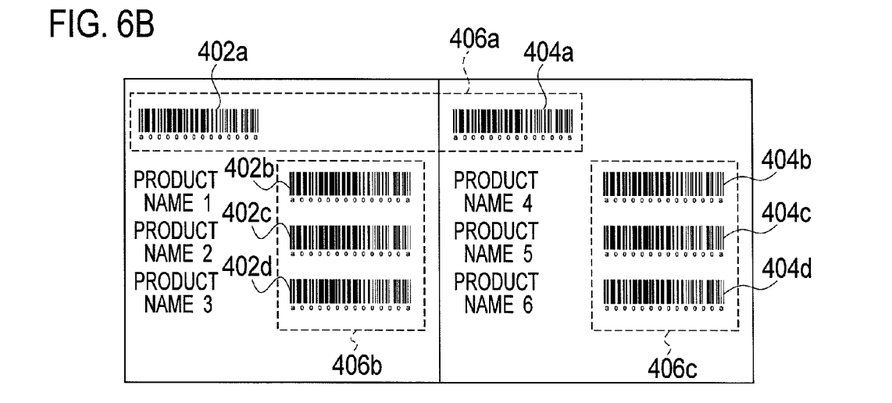
FIG. 6B is a diagram for explaining an example in which a region containing a barcode is specified as a region by performing an operation of surrounding the barcode in the client terminal in the variation 1 of the present embodiment.
Figure 6C:
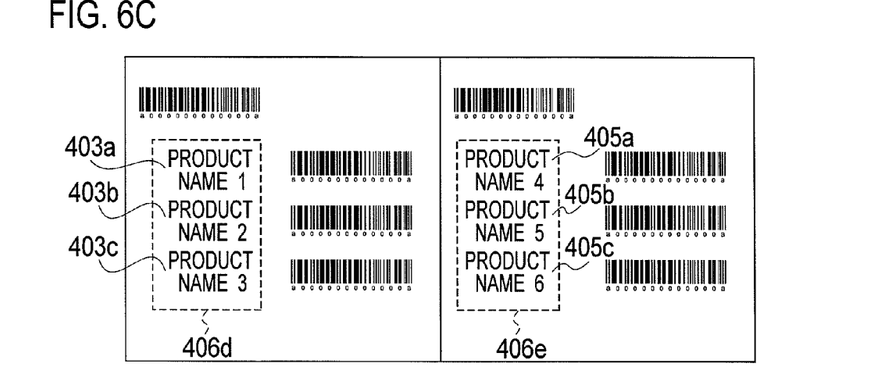
FIG. 6C is a diagram for explaining an example of specifying a region containing the barcode as a region by performing the operation of surrounding those other than the barcode in the client terminal in the variation 1 of the present embodiment.

FIGS. 6A, 6B, and 6C are diagrams for explaining region specification of the client terminal which is the variation 1 of the present embodiment. FIG. 6A is a diagram illustrating an example of original data which is form data created in the client terminal 14 in the present embodiment, FIG. 6B is a diagram for explaining an example of specifying a region containing a barcode as a region by means of an operation of surrounding the barcode, and FIG. 6C is a diagram for explaining an example of specifying a region containing a barcode as a region by means of an operation of surrounding an image other than the barcode.

As illustrated in FIG. 6A, original data 401 having A3 size has original data 401a and 401b, each having A4 size, imposed on right and left.

The original data 401a includes barcodes 402a, 402b, 402c, and 402d and character data 403a, 403b, and 403c. Moreover, original data 401b includes barcodes 404a, 404b, 404c, and 404d and character data 405a, 405b, and 405c.

As illustrated in FIG. 6B, when the user specifies a region containing a barcode as a region by performing an operation of surrounding the barcode for the original data 401, the user needs to perform three operations of surrounding regions, that is, an operation of surrounding a region 406a containing the barcodes 402a and 404a, an operation of surrounding a region 406b containing the barcodes 402b, 402c, and 402d, and an operation of surrounding a region 406c containing the barcodes 404b, 404c, and 404d.

Thus, in the client terminal 14 which is the variation 1 of the present embodiment, the user performs an operation of surrounding an image other than the barcodes so that the region specifying unit 110a specifies a region other than the surrounded image as a region containing a barcode.

Specifically, as illustrated in FIG. 6C, it is only necessary that the user performs an operation of surrounding a region 406d containing the character data 403a, 403b, and 403c and an operation of surrounding a region 406e containing character data 405a, 405b, and 405c.

As a result, the user can specify a region containing a barcode only with two operations, and the number of operations can be reduced.

<Variation 2>

In the variation 1 of the present embodiment, the region specifying unit 110a specifies a region other than the surrounded image as a region containing a barcode by performing an operation of surrounding the image other than the barcode, but further in the variation 2 of the present embodiment, processing in a case in which a print image which is a color photo image is present in a region specified as a region containing a barcode will be described.

Figure 7:
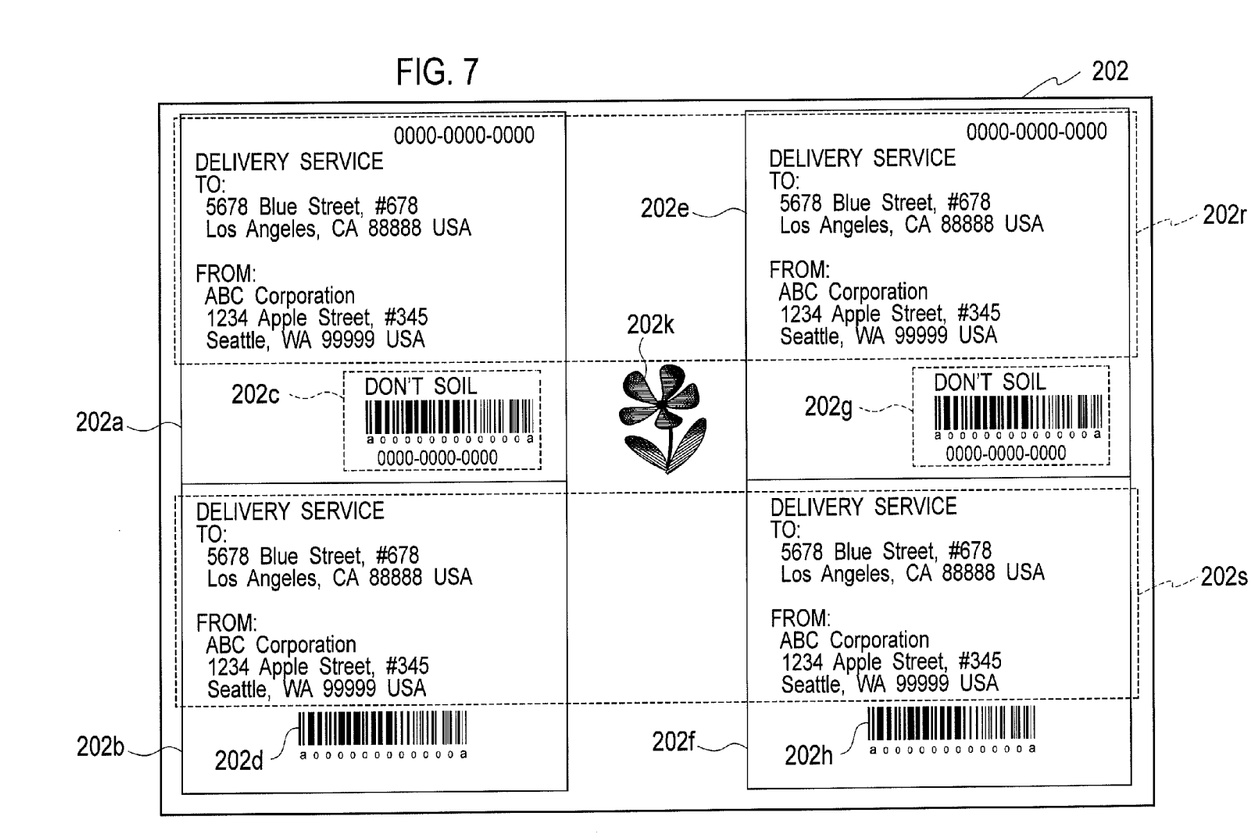
FIG. 7 is a diagram illustrating an example of the original data which is the form data created in the client terminal which is a variation 2 of the present embodiment.

FIG. 7 is a diagram illustrating an example of original data 202 which is form data created in the client terminal 14 which is the variation 2 of the present embodiment.

As illustrated in FIG. 7, the original data 202 includes print images 202a and 202b created in color, and the print images 202a and 202b include barcodes 202c and 202d, respectively. Moreover, the original data 202 includes print images 202e and 202f created in color, and the print images 202e and 202f include barcodes 202g and 202h, respectively. Furthermore, in the original data 202, a print image 202k which is a color photo image is provided.

If the original data 202 is such form data, in order to specify a region containing a barcode, a user needs to perform four operations of surrounding the regions containing the barcodes 202c, 202d, 202g, and 202h, respectively.

Accordingly, in order to reduce the number of operation times, the user wishes to specify a region containing a barcode with two operations, that is, an operation of surrounding a region containing the barcodes 202c and 202g and an operation of surrounding a region containing the barcodes 202d and 202h, but if the operation of surrounding the region containing the barcodes 202c and 202g is performed, the specified region will contain the print image 202k.

Assuming that the print image 202k is a color photo image and contains black color, if the specified region contains the print image 202k, the black portion of this print image 202k might be subjected to the density reduction processing.

Moreover, if an operation of surrounding an image other than a barcode is performed, the region specifying unit 110a specifies a region other than the surrounded image as a region containing a barcode, but in this case, too, since the region containing the barcode contains the print image 202k, the black portion of this print image 202k is subjected to the density reduction processing.

Thus, in the client terminal 14 which is the variation 2 of the present embodiment, a type of image arranged in the vicinity of a barcode is determined by image area separation. For example, if the region specifying unit 110a determines that an image is arranged in the vicinity of a barcode, it is determined whether the image is any of a character, illustration or a photo (color).

If there is a character in the vicinity of the barcode, the region specifying unit 110a specifies a region as a region 202r or 202s, for example, so that the character is contained, specifies a region other than the specified region as a region containing the barcode and performs density reduction processing on the region other than the photo.

Alternatively, if there is a photo in the vicinity of a barcode, the region specifying unit 110a specifies the regions 202a and 202b and the regions 202e and 202f as regions containing barcodes, for example, so that the photo is not contained, and performs density reduction processing on the regions other than the character in the specified regions.

As described above, in the client terminal 14 which is the variation 2 of the present embodiment, since the type of an image is determined by image area separation, it is only necessary to specify either of a region containing a barcode or a region not containing a barcode as a region. As a result, the number of operation times can be reduced similarly to the variation 1 of the present embodiment.

Therefore, when the user specifies a region, whether the specified region is a region containing a barcode or whether a region other than the specified region is a region containing a barcode may be switched by the user's operation. That is, whether a region containing a barcode is specified by the user's operation of surrounding the barcode, or whether a region other than the surrounded image is specified as a region containing a barcode by the user's operation of surrounding the image other than the barcode, may be switched by the user's operation.

In the present embodiment, the user performs an operation of surrounding a barcode by using a mouse which is the input portion 19, but it may be so configured that barcode reading is performed on the entire original image and the original image is separated into a barcode and an image other than that so that a region is specified automatically.

Moreover, in the present embodiment, barcodes were used as an example of specific image data for explanation, but barcodes are not limiting and any identification code indicating information such as numerical values, characters and the like such as two-dimensional codes can be used.

The present invention is not limited to the above-described embodiment as it is, and it can be embodied by modifying components without departing from the spirit of the invention in an implementation phase. In addition, various inventions can be formed by appropriate combinations of the plurality of components disclosed in the above-described embodiment. For example, some components may be eliminated from all the components shown in the embodiment.

The present application claims priority on the basis of Japanese Patent Application No. 2012-283980 filed on Dec. 27, 2012 and the entire contents of this application are incorporated herein by reference.

INDUSTRIAL APPLICABILITY

According to the present invention, even if specific image data and non-specific image data are overlapped or close to each other, it is possible to print the specific image data so as to be easily readable and also print clearly the non-specific image data.

DESCRIPTION OF REFERENCE NUMERALS 1 inkjet recording device (printer)
10 control unit
14 client terminal (printing controller)
16, 90 CPU
17, 91 ROM
18, 92 RAM
19 input portion
20 output portion
21, 93 external storage device
80 display
101 scanner unit
102 printer unit
110 printer driver
110a region specifying unit
110b color determiner
110c density reduction processor (predetermined processor)
110d print data creating unit

What is claimed is:

1. A printing controller for making a printer perform printing processing by sending print data, comprising:
a region specifying unit configured to specify a region containing specific image data which is a target to be subjected to predetermined processing and is constituted by a same color and non-specific image data constituted by a color different from the same color in original data;
a color determiner configured to determine whether or not each pixel has the same color in the region specified by the region specifying unit;
a predetermined processor configured to apply the predetermined processing to the pixel determined by the color determiner to have the same color;
a print data creating unit configured to create the print data on the basis of the original data subjected to the predetermined processing; and
a color condition information storage unit configured to store a determination condition of color composition ratio for each ink color for determining to have the same color of the specific image data,
wherein the color determiner determines that each pixel in the region specified by the region specifying unit has the same color if all the determination conditions for each ink color are satisfied, and
wherein the specific image data is a barcode image and the predetermined processing is processing for reducing print density of the barcode image.

* * * * *